United States Patent [19]

Kunz

[11] 3,970,280
[45] July 20, 1976

[54] VENTING VALVE FOR A STEAM DECORTICATOR

[76] Inventor: Paul Kunz, 5419 Doettesfeld, Germany

[22] Filed: May 22, 1974

[21] Appl. No.: 472,216

[30] Foreign Application Priority Data

May 24, 1973 Germany............................. 2326609

[52] U.S. Cl.................................. 251/58; 251/62; 251/63.4; 251/361
[51] Int. Cl.² ........................................ F16K 31/163
[58] Field of Search ............ 251/361, 58, 63.4, 245, 251/62

[56] References Cited
UNITED STATES PATENTS

| | | | |
|---|---|---|---|
| 2,088,882 | 8/1937 | Trimmer............................ | 251/245 |
| 2,206,215 | 7/1940 | Allison et al..................... | 251/361 X |
| 2,695,032 | 11/1954 | Kmiecik.......................... | 251/361 X |
| 2,745,626 | 5/1956 | Wilson............................. | 251/62 X |
| 3,052,444 | 9/1962 | Kintner........................... | 251/62 |
| 3,542,332 | 11/1970 | Chevalier......................... | 251/62 X |

FOREIGN PATENTS OR APPLICATIONS 314,312  9/1919  Germany ............................ 251/58

*Primary Examiner*—Arnold Rosenthal
*Attorney, Agent, or Firm*—W. G. Fasse; W. W. Roberts

[57] ABSTRACT

A venting valve for a steam decorticator has a valve chamber connected by way of a straight conduit to the pressure vessel of the decorticator. A replaceable valve seat is provided in the connection between the valve chamber and the conduit, and a valve, normally biased to its open position, is disposed in the valve chamber in such a position that direct flow of liquids from the conduit impinge on the head of the valve. The valve head is also replaceable.

10 Claims, 3 Drawing Figures

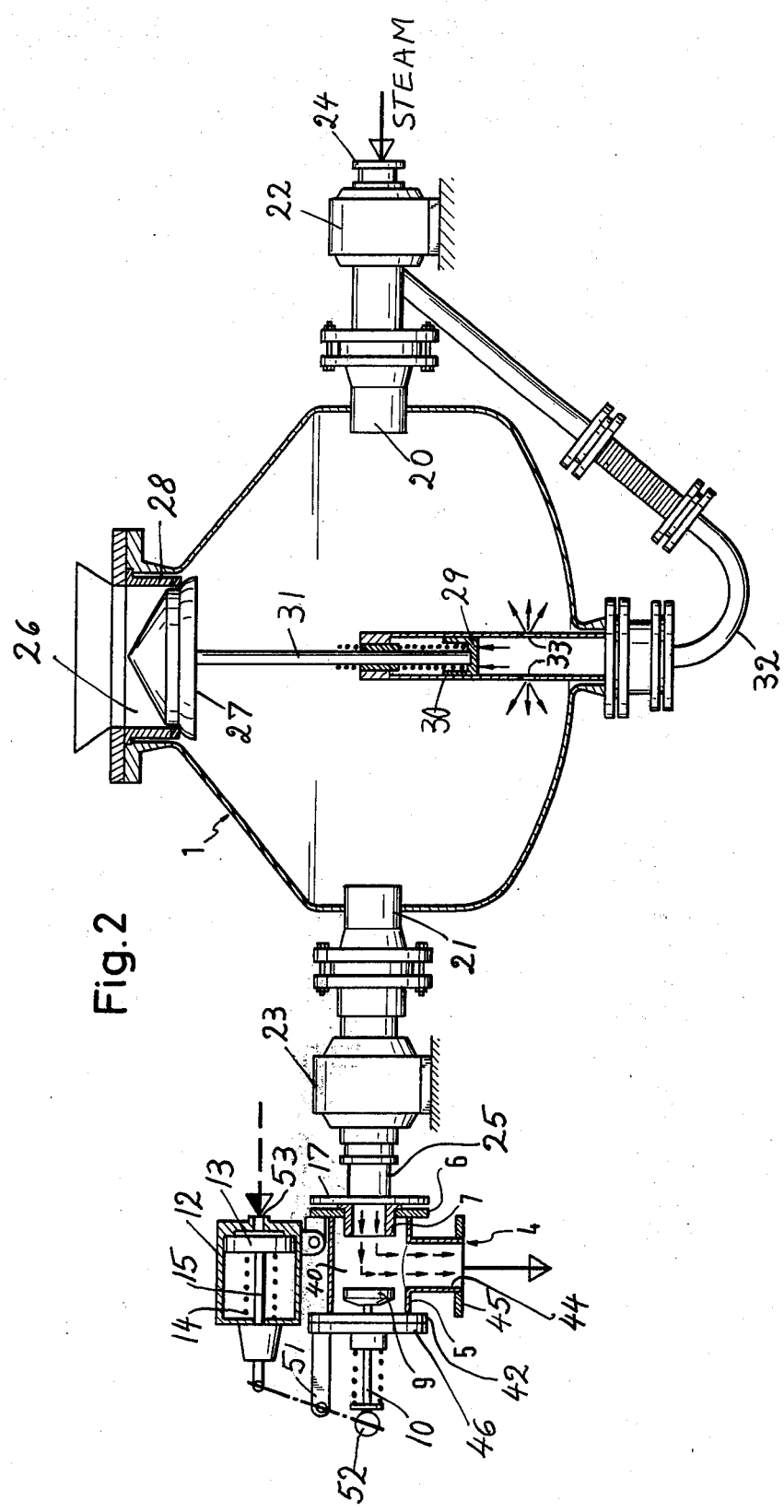

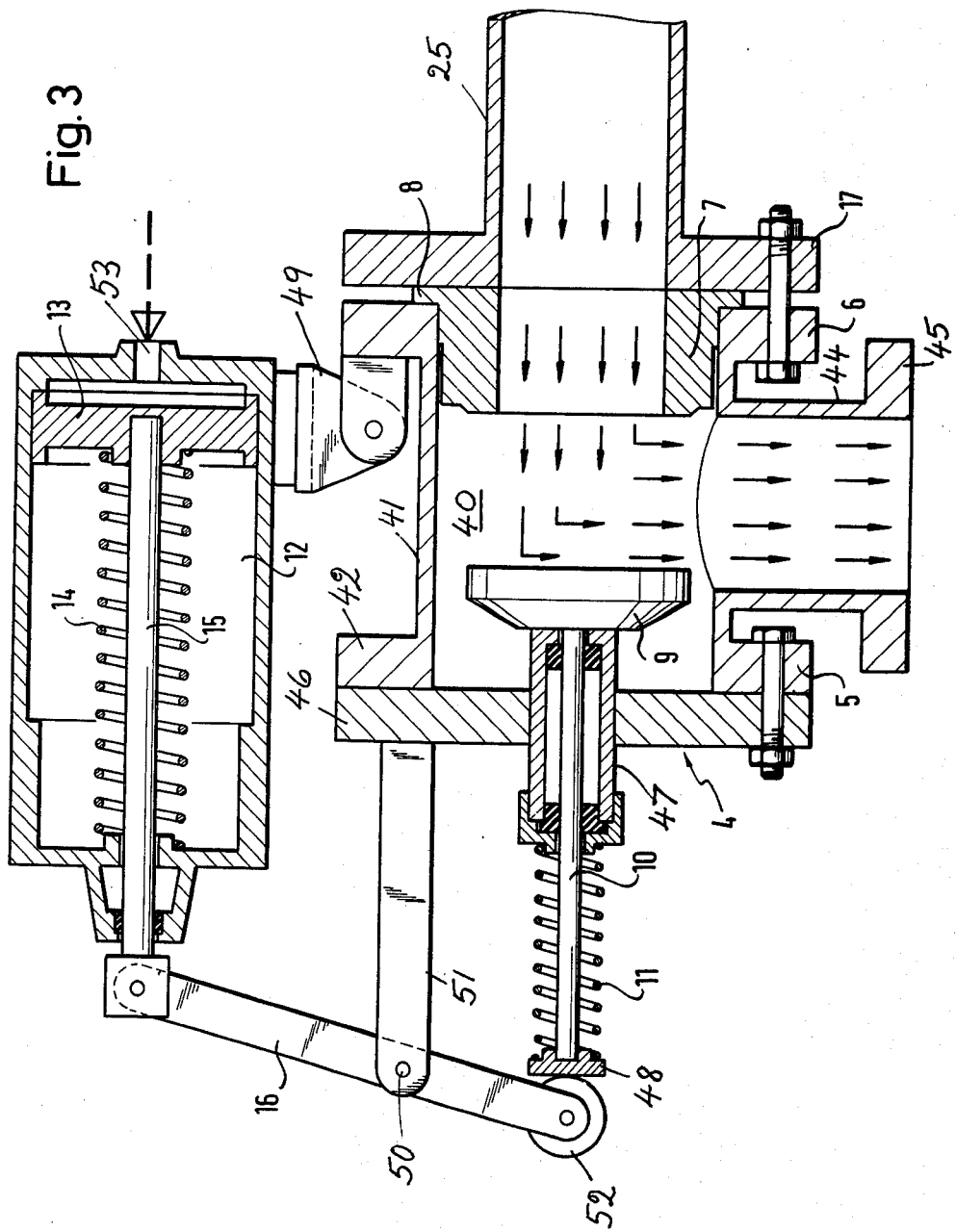

3,970,280

VENTING VALVE FOR A STEAM DECORTICATOR

BACKGROUND OF THE INVENTION

This invention relates to steam decorticators of the type having a pressure vessel for the steam peeling of fruits and vegetables, such as potatoes, and is particularly directed to a venting valve for use on such steam decorticators.

Steam decorticators of the type considered here, are comprised of a steam vessel adapted to receive fruit or vegetables to be peeled. The pressure vessel is rotatably mounted, and is provided with a conduit for introducing steam, a conduit for venting steam, an opening for receiving and discharging the fruits and vegetables, and a closure for closing the opening during the processing of the fruits or vegetables.

A steam decorticator of this type is disclosed, for example, in U.S. Pat. application Ser. No. 469,613 filed May 13, 1974 which discloses a decortication process in which steam is introduced into the pressure vessel following the loading of the vessel with fruits or vegetables and the closure of the closure member. The heated steam increases the pressure and temperature within the vessel, so that the layer of the fruit or vegetable just under the peel comes to a boil when the pressure in the vessel is then rapidly released by way of the venting conduit, to effect the stripping of the peel from the fruits or vegetables. The removal of the peel from the fruits or vegetables is aided by the rubbing of the fruits or vegetables against each other as the pressure vessel is rotated.

In one known construction of such a steam decorticator, as described, for example, in German Pat. No. 1,234,690, the venting valve is a conventional diaphragm type of valve. The valve is connected to the pressure vessel by way of a curved pipe section which extends downwardly from the venting outlet conduit of the pressure vessel, the valve being connected to the lower end of the curved pipe section.

In the decortication of fruit or vegetables in such a system, a considerable quantity of sand and other dirt is entrained in the fluids vented by way of the outlet venting conduit, such sand and dirt having been removed in the pressure vessel from the fruits or vegetables to be peeled. Such sand and other dirt is consequently vented together with the steam, by way of the curved pipe section and the venting valve, for discharge by way of an adjacent stand pipe. In the arrangement of the above German patent, the valve has a small working stroke, and the valve body has a small volume. Consequently, the steam passing through the valve has a high velocity, so that the valve body is subjected to rapid wear by the entrained solids. In addition, the curved pipe section is subject to considerable wear by the solids entrained in the steam, since the sand and other dirt abrade the inner surface thereof, for example, to effect the "sand blasting" of the curved pipe section.

In order to enable a greater appreciation of the above disadvantages of the steam decorticator of the type disclosed in the above German patent, an apparatus of this type will be described in greater detail with reference to FIG. 1 of the drawings.

OBJECTS OF THE INVENTION

In view of the foregoing, it is the aim of the invention, to achieve the following objects, singly or in combination:

to provide a venting valve for a steam decorticator which overcomes the above disadvantages of prior art devices;

to provide a venting valve arrangement for a steam decorticator, wherein portions of the valve subject to wear are readily replaceable;

to provide a venting valve for a steam decorticator which does not require the use of a curved pipe section which has a large stroke to minimize the velocity of steam in the valve body, and in which the valve seat and valve closure member may be readily replaceable; and to provide a combination of a steam decorticator and venting valve wherein the venting valve is connected by a straight conduit to the pressure vessel, thereby obviating the necessity of employing a curved pipe section, and wherein the venting valve has readily replaceable valve components.

SUMMARY OF THE INVENTION

Briefly stated, in accordance with the invention, the above objects are achieved by providing a venting valve for a steam decorticator, comprising a valve chamber, an inlet into the chamber for venting gas, an outlet from the chamber disposed at an angle to the inlet, a replaceable valve seat mounted in the chamber, and a closure member in the chamber and movable to engage the valve seat to close the valve. Preferably, the inlet and outlet of the chamber are arranged so that the angle between the gas flow at the outlet and the gas flow at the inlet is at least 60°, and is most preferably 90°.

In order for the stream of venting gas to strike the front face of the valve closure member, and thereby tend to urge it away from the valve seat, the inlet to the valve preferably extends by way of the valve seat. The valve seat is thus preferably a tubular member which may be inserted into an aperture in the chamber wall from the outside of the valve chamber. The seat may be provided with a flange to limit its movement into the valve chamber during the insertion thereof into the aperture.

The valve closure member of the venting valve is also replaceable, for example, by way of the aperture into which the valve seat is inserted.

The invention is also directed to the provision of a steam decorticator having a venting valve as above described.

BRIEF FIGURE DESCRIPTION

In order that the invention may be clearly understood, it will now be described by way of example, with reference to the accompanying drawings, wherein:

FIG. 2 is a partially cross sectional view of a steam decorticator, as shown in FIG. 1, and including a venting valve in accordance with an embodiment of the present invention; and FIG. 3 is an enlarged cross sectional view of the venting valve in accordance with the invention as illustrated in FIG. 2.

DETAILED DESCRIPTION OF EXAMPLE EMBODIMENTS

Figure 1:
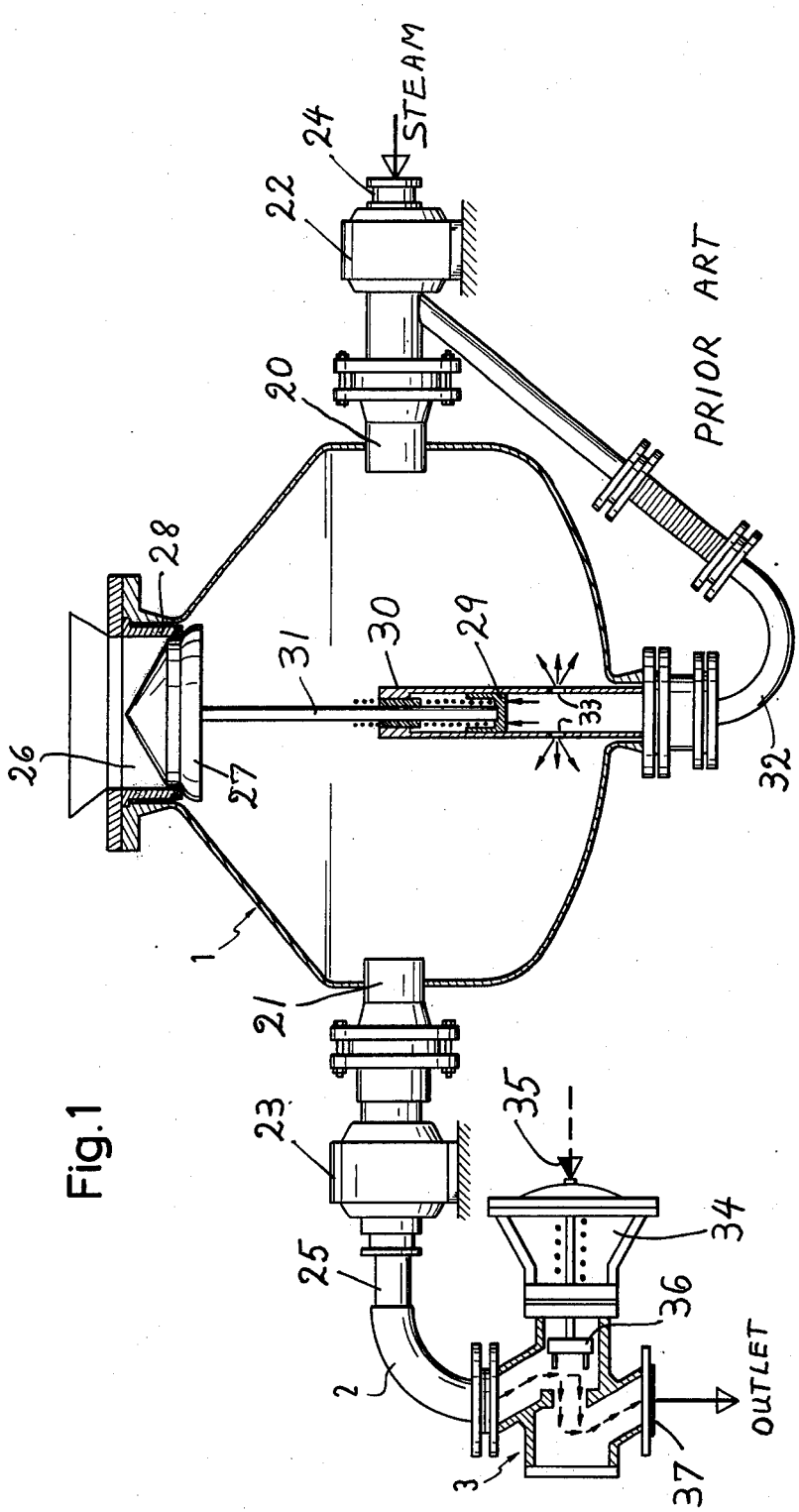
FIG. 1 is a simplified partially cross sectional view of a steam decorticator and a venting valve therefor, in accordance with the prior art.

Referring now to the drawings, and particularly to FIG. 1 therein is illustrated a known combination of a steam decorticator and venting valve. The steam decorticator is comprised of a pressure vessel 1 having aligned inlet and outlet conduits 20 and 21 respectively, the inlet and outlet conduits being journaled for rotation in suitable bearings 22 and 23. Rotatable joints for the conduits are provided in the bearings 22 and 23, and suitable means (not shown) are provided for rotating the pressure vessel, for example, by way of a belt drive coupled to one of the conduits. Steam is introduced into the pressure vessel by way of a conduit 24 extending to the bearing 22, and steam is removed from the pressure vessel by way of the fixed conduit 25 and the rotatable conduit 21. The pressure vessel 1 is provided with an opening 26 for the loading and unloading thereof with fruits and vegetables and an internally operable valve closure member 27 is provided cooperating with the valve seat 28 in the opening. The closure member 27 is operated by means of a piston 29 in a cylinder 30, the cylinder 30 being mounted to extend transversely of the axis of rotation of the pressure vessel. The piston 29 is connected to the valve closure member by way of a piston rod 31. Suitable conduits 32 are provided extending from the steam inlet conduit 20 to the bottom of the pressure vessel 1 and thence into the cylinder 30. The cylinder 30 may be provided with apertures 33 leading to the inside of the pressure vessel, so that a certain amount of steam is intro duced into the pressure vessel by this means during the closing of the closure member 27.

The steam decorticator as above described is connected to the venting valve 3 by way of a downwardly extending curved pipe section 2 extending between the fixed conduit 25 and the valve 3. The valve 3 is a conventional diaphragm valve having a diaphragm actuating assembly 34 operable in response to pressure applied to inlet 35, to control a valve closure member 36. The venting gas stream passes parallel to the surface of the plate which comprises the moving member of a valve, and consequently external forces are required to open the valve. The steam escaping from the pressure vessel 1, by way of conduits 21 and 25, and containing a proportion of sand and other dirt, is guided through the curved pipe 2 and valve 3 and is discharged from the valve 3 at the outlet port 37. The outlet port may be connected to a suitable stand pipe leading to a collecting point for the waste substances. The sand entrained by the steam causes considerable wear in the curved connecting pipe 2, since the sand continuously removes material from the wall of the pipe 2 in a manner similar to a sand blasting operation. Similarly, the sand also causes considerable wear in the venting valve 3. Since the valve body has only a small volume, the valve may become readily blocked by the sand entrained in the steam. Consequently, in the past it has been found that frequent replacement of the entire valve assembly is necessary.

The steam decorticator as above described may be operated in the manner above described with reference to copending U.S. Pat. application Ser. No. 469,613.

In accordance with the present invention, the above disadvantages of the prior art arrangement of FIG. 1 are overcome by the provision of a venting valve as illustrated in FIGS. 2 and 3, wherein in angle valve 4 (i.e., a valve having an angle between the inlet and outlet flow) is provided instead of the known diaphragm valve of FIG. 1. FIG. 2 illustrates the combination of the valve in accordance with the invention with the steam decorticator as shown and described in FIG. 1, and FIG. 3 illustrates the detailed construction of the valve in accordance with the invention.

Referring now to FIGS. 2 and 3, the valve body 5 of the valve 4, which encloses the valve chamber 40, may be fabricated of standard heating tubes and standard flanges. The components are welded together to form the valve body 5. The valve body 5 may thus be formed of a tube 41 defining the chamber, the tube 41 having a flange 42 on one end and a flange 6 on the other end. A tube 44 is welded to the tube 41 to extend transversely thereof to form the outlet conduit, the tube 44 having a flange 45 on its free end. A plate 46 is bolted to the flange 42 to seal one end of the chamber 40.

The flange 6 is bolted to the connecting flange 17 of the conduit 25 leading from the pressure vessel 1. The inlet to the valve chamber extends through an annular valve seat 7 which is formed as a tubular member having an outer diameter selected so that the valve seat fits removably into the aperture of the chamber 40 extending through the flange 6. The external dimensions of the valve seat 7 at its outer end 8 are greater than the inner diameter of the flange 6, whereby the outer ends 8 of the valve seat forms a flange. When the flange 6 of the valve chamber is bolted to the flange 17 of the conduit 25, a seal is thereby provided between the valve seat 7 and the valve chamber by means of the projection flange 8 of the valve seat 7. Thus, in order to interchange the valve seat 7 with another valve seat, it is merely necessary to unscrew the connecting bolts between the two flanges 6 and 17 and to remove the valve seat and insert therein the replacement valve seat. The valve closure member comprises a plate 9 carried in the valve chamber 40 on a spindle 10, the spindle 10 passing through suitable seals in a sealing assembly 47 in the plate 46, in order to permit sliding of the spindle 10 through the chamber wall. The spindle 10 is normally biased outwardly by a compression spring 11 extending between the assembly 47 and a plate 48 affixed to the outer end of the spindle, in order to continuously maintain the valve plate 9 in its open position.

Operation of the valve is effected by means of a cylinder 12 suitably mounted on the valve, for example, by a pivotal mounting 49 to the flange 6. A piston 13 is provided in the cylinder 12, and a piston rod 15 is connected to be moved by the piston 13. The piston rod 15 sealingly extends through one end wall of the cylinder 12, the outer end of the piston rod 15 being pivotally connected to a lever 16. The lever 16 is pivoted at a point 50 between its ends, for example, by means of a support 51 affixed to the plate 46, and the other end of the lever 16 is adapted to engage the plate 48, for example by way of a roller contact 52, so that movement of the piston 13 in cylinder 12 effects the movement of the valve plate 9 upon the application of pressure to a pressure inlet 53 in the other end wall of the cylinder 12. A compression spring 14 in the cylinder 12 urges the piston 13 toward the pressure inlet 53, so that the piston rod 15 normally exerts no closing force on the valve plate 9. When pressure is applied to the pressure inlet 53 from a conventional source, the valve plate 9 is closed against the valve seat 7 due to the coupling of the force by way of the piston rod 15, lever 16 and spindle 10.

The valve plate 9 is provided with an internal screw thread, not shown, engaging an external screw thread on the end of the spindle 10, so that the valve plate 9 is also replaceable, by screwing it from the spindle 10, when the valve seat 7 has been removed.

The outlet from the valve chamber 40 extends downwardly, as illustrated, so that the venting gas stream entering the valve by way of valve seat 7 first strikes the front face of the valve plate 9, thence changes its direction by 90° to exit through the outlet. The direction of movement of the valve plate 9 is parallel to the gas stream entering the valve chamber, and is hence perpendicular to the gas stream which exits from the valve chamber. When the valve plate 9 is closed against the valve seat 7, pressure in the conduit 25 leading to the valve urges the plate 9 off its seat, so that no external force is required to open the valve when the pressure in the cylinder 12 is released. The opening is, of course, also assisted by the spring 11.

The surface of the inlet passage through the valve seat 7 is especially subject to wear, when the valve is closed, by dirt and sand directed through the conduit 25 and swirling against the valve plate 9. The easy replaceability of the valve seat 7 is thus a great advantage, as is the easy replaceability of the plate 9, which is also especially subject to wear. These two components are independently replaceable (although in this embodiment of the invention the valve seat 7 must be removed to allow replacement of the valve plate 9).

The inlet opening of the valve extends horizontally, and is directly connected by the straight conduit 25 to the outlet opening of the pressure vessel 1, and consequently the present invention does not require the provision of a curved conduit, as was necessary in the arrangement of the prior art, as illustrated in FIG. 1.

The volume of the valve chamber in accordance with the invention may be made very large. This feature not only permits the provision of a larger working stroke, but also appreciably reduces the risk of clogging of the valve. Deposition of sand and dirt in the corners of the valve body may even result in less wear in the inner wall of the valve body than would otherwise be the case.

Although the invention has been described with reference to specific example embodiments, it is to be understood, that it is intended to cover all modifications and equivalents within the scope of the appended claims.

What is claimed is:

1. A venting valve for a pressure vessel, comprising a housing defining a valve chamber, and having an inlet passage extending into said chamber for venting gas, and an outlet passage extending from said chamber at an angle to said inlet passage, replaceable valve seat means in said chamber, a valve closure member movably mounted in said chamber out of contact with the inner walls of said chamber to engage said valve seat for closing the valve, said valve closure member being movable to a position to deflect gases from said inlet passage to said outlet passage, means normally biasing said valve to its open position, said valve chamber comprising respective valve chamber walls, said inlet passage extending through one wall of said valve chamber, said outlet passage extending at an angle to said inlet passage through another wall of said valve chamber, said valve seat means comprising a tubular valve seat removably mounted in said inlet passage, a spindle, sealing means extending through a wall of said valve chamber opposite said one wall and aligned with said inlet passage, said spindle passing through said sealing means in a sealed manner, said valve closure member being mounted on said spindle within said valve chamber and aligned with said valve seat, and means coupled to said spindle externally of said valve housing for selectively urging said valve closure member against said valve seat, said means for selectively urging said valve closure member comprising a cylinder, a piston slideably mounted in said cylinder, a piston rod connected to said piston and extending externally of said cylinder, and a pivoted lever coupling the external end of said piston rod to said spindle, said cylinder having a pressure inlet opening, whereby application of pressure to said pressure inlet opening effects movement of said piston, piston rod, lever and spindle to move said valve closure member against said valve seat within said chamber.

2. The venting valve of claim 1, wherein said outlet passage extends at an angle from 60° to 90° to said inlet passage.

3. The venting valve of claim 1, wherein said outlet passage extends perpendicularly to said inlet passage.

4. The venting valve of claim 1, wherein said inlet passage extends through said valve seat, whereby gas pressure in said inlet passage urges said closure member away from said valve seat.

5. The venting valve of claim 1, wherein said tubular valve seat is mounted to be insertable in said inlet passage from externally of said housing.

6. The venting valve of claim 5, comprising a flange on said tubular valve seat positioned to engage said housing to limit the movement of said tubular valve seat into said valve chamber upon insertion of said tubular valve seat in said inlet passage from externally of said housing.

7. The venting valve of claim 1, wherein said valve closure member is removably mounted on said spindle.

8. The venting valve of claim 1, wherein said housing comprises a first tubular member defining said chamber and having a flange at each end, one end of said tubular member comprising said inlet passage, plate means connected to the flange at the other end of said tubular member for sealing said other end of said tubular member, and a second tubular member connected to said first tubular member to extend transversely of the axis of said first tubular member, said second tubular member defining said outlet passage, said plate means defining said wall of said valve chamber opposite said one wall, whereby said sealing means extends through said plate means and sealingly supports said spindle for movement axially of said first tubular member, said valve closure member comprising a valve closure plate threaded to the end of said spindle within said valve chamber, said valve closure plate having a valve face toward said inlet passage which extends normal to the axis of said first tubular member.

9. The venting valve of claim 1, wherein said means normally biasing said valve to its open position comprises means mounted to normally bias said spindles to hold said valve closure member away from said valve seat.

10. The venting valve of claim 1, wherein said valve closure member comprises a valve closure plate of substantially smaller dimensions than the insides of said valve chamber, and removably mounted to the end of said spindle in said valve chamber, said outlet passage extending at an angle of 90° to said inlet passage, and wherein said biasing means comprises means normally biasing said spindle to hold said valve closure plate away from said valve seat.

* * * * *